(12) United States Patent
Soland

(10) Patent No.: US 6,775,971 B1
(45) Date of Patent: Aug. 17, 2004

(54) METHOD FOR SUPPLING COMBUSTION AIR TO A COMBUSTION CHAMBER, INCLUDING ARRANGEMENTS IN SAID COMBUSTION CHAMBER AND USE OF OXYGEN-CONTAINING EXHAUST FROM A GAS TURBINE

(76) Inventor: Arne Soland, Gauselbakken 62, N-4032, Gausel (NO)

( * ) Notice: Subject to any disclaimer, the term of this patent is extended or adjusted under 35 U.S.C. 154(b) by 673 days.

(21) Appl. No.: 09/284,076
(22) PCT Filed: Oct. 7, 1997
(86) PCT No.: PCT/NO97/00269
§ 371 (c)(1),
(2), (4) Date: Apr. 6, 1999
(87) PCT Pub. No.: WO98/15729
PCT Pub. Date: Apr. 16, 1998

(30) Foreign Application Priority Data

Oct. 10, 1996 (NO) .................................. 964298

(51) Int. Cl.$^7$ ............................................... F02C 6/04
(52) U.S. Cl. .................................................... 60/39.12
(58) Field of Search ............................ 60/39.02, 39.07, 60/39.12, 39.465

(56) References Cited

U.S. PATENT DOCUMENTS

| | | | |
|---|---|---|---|
| 4,193,259 A | * 3/1980 | Muenger et al. | ........... 60/39.04 |
| 4,261,167 A | * 4/1981 | Paull et al. | ................. 60/39.02 |
| 5,434,123 A | 7/1995 | Sakashita et al. | |
| 5,461,853 A | 10/1995 | Vetterick | |
| 5,617,715 A | 4/1997 | Beer et al. | |
| 6,167,693 B1 | 1/2001 | Anderson | |

FOREIGN PATENT DOCUMENTS

GB 2146632 4/1985

OTHER PUBLICATIONS

Cohen, H, Rogers, G.F.C., and Saravanamuttoo, H.I.H., "Gas Turbine Theory" Longman, London, pp. 63, 69–72, 1972.*

J.V. Albano & T. Fukushima, Gas Turbine Integration in Ethylene Plants, ABB Review 4/92, p. 3–14.

* cited by examiner

Primary Examiner—Ehud Gartenberg
(74) Attorney, Agent, or Firm—Sue Z. Shaper, P.C.

(57) ABSTRACT

A reformer which may be included in a process plant, comprises a reactor chamber having a combustion chamber, to which fuel and combustion air are supplied. The exhaust gas from the combustion chamber may have a very high temperature, for example 650° C. The combustion chamber supplies heat energy to the reactor chamber in which a heat treatment of gas can take place. The process plant comprises at least one gas turbine. In order to reduce the consumption of energy, the exhaust gas discharge outlet of the gas turbine is through a channel, directly or indirectly, in fluid communication with the combustion air inlet of said combustion chamber, so that turbine exhaust gas preheated to a substantial temperature, e.g. 350–450° C., is blown through said channel, etc., through the overpressure of the turbine exhaust gas, e.g. of up to 0.5 bar, without the need for a fan, to the intake of the combustion chamber.

5 Claims, 1 Drawing Sheet

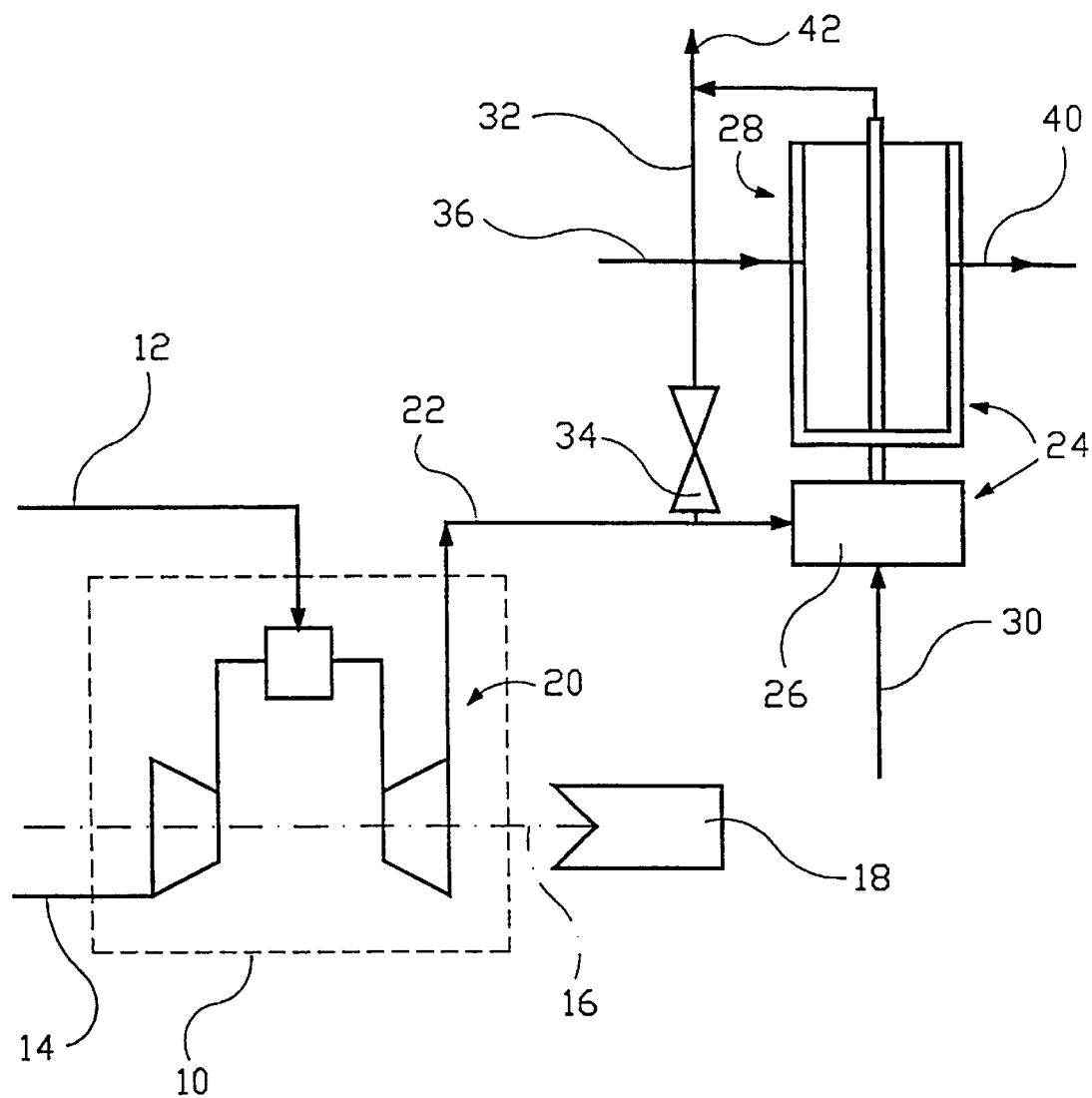

METHOD FOR SUPPLING COMBUSTION AIR TO A COMBUSTION CHAMBER, INCLUDING ARRANGEMENTS IN SAID COMBUSTION CHAMBER AND USE OF OXYGEN-CONTAINING EXHAUST FROM A GAS TURBINE

FIELD AND BACKGROUND OF THE INVENTION

The invention relates to a method for supplying combustion air to a combustion chamber. Further, the invention relates to suitable arrangements in a combustion chamber as well as a special use of oxygen-containing exhaust from a gas turbine or another engine fuel combusting unit/equipment/apparatus.

More specifically, the invention relates to a method associated with the supply of oxygen-containing combustion air to a first engine fuel combusting unit, e.g. a combustion chamber. The arrangements involving a combustion chamber according to the invention is of the kind including a combustion chamber which may be assigned to a refining unit for gases, a so-called reformer which, possibly together with one or more further reformers, may be included in a process plant, and/or one or more other units which might have a need for supplied heat energy from one or more combustion chambers, for instance for heat treatment of gases within said unit(s), which reformer or each reformer, respectively, may comprise a reactor chamber assigned a combustion chamber, possibly one combustion chamber each, adapted to be supplied with gas or liquid fuel and oxygen-containing combustion air for the burning thereof, and where the heat energy produced in the combustion chamber is supplied to e.g. said reactor chamber, in which for instance a gas treatment is carried out such as a heat treatment of methane which, in treated condition, may be taken out in the form of synthesis gas for e.g. methanol production. The use of oxygen-containing exhaust from e.g. a gas turbine as combustion air for e.g. a combustion chamber, is more specifically defined.

The arrangements and devices in accordance with the invention may for instance be used in a combustion chamber, which may be assigned a so called "reformer" which may on its side be incorporated into a process plant, and which reformer comprises a reactor chamber for the treatment of gases. The combustion chamber, as well known, is supplied with gas or liquid engine fuel and combustion air. In the reactor chamber, for example, methane-containing gas may be treated for the achievement of a refined methane gas upon supplied heat from the combustion of engine fuel in the combustion chamber during combustion air supply. The process plant comprises at least one gas turbine which may be adapted to operate a generator for the generation of electrical current, e.g. for use within the process plant.

During the development of the present invention, importance has been especially attached to the reduction of energy consumption and to exhaust discharge from the process plant, i.e. gas effluents such as CO, $CO_2$, $NO_x$ and $VO_x$ to the atmosphere and/or into water.

The invention is particularly, yet not exclusively, aimed at providing an offshore production plant, e.g. a methanol factory built up on an offshore installation, and which does not contaminate the surroundings any more than the very best plants on land and wherein, moreover, as previously mentioned, large energy savings and exhaust discharge reductions are achieved. The invention applies also in relation to plants ashore. In offshore production the necessary energy must be provided in situ through the combustion of fossil fuel in lieu of electrical power, which often is produced ashore by means of waterpower.

Methane, $CH_4$, is as known the most important constituent in natural gas and appears i.e. as gas exiting from the crust of the earth. So called methane towers are known in the form of distillation towers for evaporating methane.

Upon the adaptation of, for instance, a methanol factory at an offshore production plant, substantial energy supply in the form of electrical current and heated air is required. Total need of electricity for installations of this kind could vary from 10 to 50 MW, while the need for hot air having a high temperature, e.g. 650° C., could vary from 50 to about 200 kgs/second.

Conventionally, these types of energy are provided by means of separate gas turbine operated generators for the generation of electrical current and combustion chambers for the combustion of gas or liquid fuel during the supply of combustion air, and production of heated air having the required temperature (650° C.), said combustion chambers being incorporated in suitable reformers which, likewise, comprise a reactor chamber which is fed with gas for treatment, the reformers being included in a process plant.

In the combustion chamber, the necessary amounts of air must be heated from ambient air temperature to the desired exhaust temperature. This means that the combustion chamber must be supplied with a substantial amount of fuel. Simultaneously, the combustion air must be allotted the necessary energy to cause flowing, such as from fans or the like, for forced supply to the combustion chamber of the reformer. This energy is typically produced by either a gas turbine or an internal combustion engine.

The above scheme results in a low total energy efficiency, and simultaneously, in offshore plants suffers from larger exhaust discharges than corresponding industry ashore.

SUMMARY OF THE INVENTION

The device according to the invention enables an increase of the total efficiency of the reformer (or each reformer, respectively, in case the process plant comprises more than one) by reducing the need for energy for a reformer as discussed above. The invention simultaneously effects a reduction in the discharge amount of exhaust from the same reformer's combustion chamber through the reduction of the amount of fuel supplied to the combustion chamber/chambers.

To this end, the invention may distinguish itself through the features of oxygen containing exhaust gas from a second fuel-burning unit, for example, a gas turbine, is led to a first fuel-burning unit, said exhaust gas preferably leaving said second fuel-burning unit's exhaust gas outlet at an overpressure.

According to the invention, exhaust gas from the gas turbine may be supplied as combustion air to the reformer's combustion chamber. As previously known, the gas turbine operates an electrical generator or another mechanical equipment.

As a rule, the oxygen-content in the exhaust gases from a gas turbine will be satisfactory in order to secure good combusting in the combustion chamber. However, it is within the scope of this invention possibly to supply a small amount of combustion air rich on oxygen in addition to a larger amount of gas turbine exhaust gas.

The exhaust gases from the gas turbines are preferably blown with an overpressure of up to 0.5 bar into the combustion chambers, in which gas or liquid engine fuel supplied thereto burns in order to bring the final temperature up to the necessary value of 650° C.

A a result electrically operated fans for forced supply of cold combustion air to the combustion chamber normally could be left out, totally resulting in quite substantial energy savings and reduced amount of exhaust gas.

Combustion gas in the form of hot turbine exhaust gas involves the great advantage over cold combustion air that the former is preheated to a substantial degree. Thus, a preheating up to a temperature of about 450° C. can be achieved, dependent on the load on the gas turbine. This entails an energy saving in relation to prior art technique where a significant amount of energy is consumed in order to heat combustion air supplied to the combustion chamber at ambient temperature, up to said 650° C. from e.g. 15° C. in relation to up to said 650° C. from gas turbine exhaust gas temperature of about 450° C. This very substantial preheating of the combustion gas received by the combustion chamber also allows energy savings, which here manifest themselves in a reduction of propellant gas amount supplied per time unit to the combustion chamber which becomes significantly less power consuming as a result of the heat energy brought into the combustion chamber with the combustion gas/air.

Significant environmental improvements are achieved through temperature reduction by the combustion in the reformer, and by leaving out a combustion air fan. Reduction of the amount of fuel supplied to the combustion chamber per time unit has also a positive influence on the exhaust gas discharges, particularly CO2 in the surroundings in relation to conventional installations, both plants ashore and plants offshore.

DETAILED DESCRIPTION OF PREFERRED EMBODIMENTS

Further advantages and features of the system and arrangements according to the invention will appear from the following description, reference being made to the attached, single, diagrammatically shown drawing figure illustrating the main components of a reformer (reforming plant) for e.g. methane refining through heat treatment in a reactor chamber assigned a combustion chamber which, in turn, is fed with gaseous or liquid fuel (natural gas) and combustion air in the form of turbine gas from a gas turbine. The reformer may be included in a process plant for the production of methanol and comprises a plurality of reformers, each including a combustion chamber to which is assigned the exhaust gas outlet from a gas turbine. The arrangement is such that the supply of exhaust gas from the gas turbine as combustion "air" (oxygen containing gas) wholly or substantially wholly meets the combustion chamber's demand for oxygen upon the combustion of propellant gas supplied to the combustion chamber.

In FIG. 1, a quadrangle shown in dot-and-dash lines indicates diagrammatically a gas turbine 10 substantially positioned therewithin, said gas turbine 10 receiving fuel through a first pipeline 12 and air through a second pipeline 14. Reference numeral 16 indicates a shaft for the supply of mechanical kinetic energy to a generator 18 for the generation of electrical energy converted from twisting movement received. This known, conventional generator 18 is adjusted to the efficiency of the gas turbine 10.

The exhaust gases from the exhaust outlet (at 20) of the gas turbine 10 contain about 16–18% $O_2$ when they leave the gas turbine with an overpressure of 0.5 bar and a temperature of 350–450° C.

The turbine exhaust gases which, in accordance with the invention are to be used as oxygen-containing combustion gas (combustion air) in the further heating process, are conducted in a suitable turbine exhaust/combustion gas (air) channel 22 to a reformer's 24 combustion chamber 26. Besides the combustion chamber 26, the reformer 24 comprises a reactor chamber 28.

To the reformer's 24 combustion chamber 26 leads a third pipeline 30 for the supply of gaseous or liquid fuel to be burned in the combustion chamber together with the oxygen contained in the turbine exhaust gas supplied thereto.

In a preferred embodiment, the exhaust gas channel 22 is assigned a bypass-loop 32 having a shutoff valve 34 which can be opened in order to couple the loop 32 into the flowing course upon starting the gas turbine 10, and which is used for adjusting the amount of exhaust gas/combusting air per time unit to the combustion chamber 26 in relation to the gaseous or liquid fuel supplied thereto.

The exhaust gases leaves the combustion chamber 26 exhibiting a temperature of up to 650° C. and transfers a substantial part of its heat energy to the overlying reactor chamber 28, while possible residual heat can be recovered by means of at least one heat exchanger, not shown. In a fourth pipeline 36, e.g. water steam and methane-containing gas is supplied to the reactor chamber 28, while a fifth pipeline 40 carries synthesis gas for methanol production.

Exhaust gases from the reactor chamber 28 of the reformer 24 and possible exhaust gases passed through the bypass-loop 32, are led together out through a chimney 42, out into the atmosphere which, due to previously indicated purposes, is polluted to a less degree than from a known plant having a corresponding capacity, but comprising fan-driven supply line for cold combustion air to a combustion chamber 26 consuming a larger amount of gaseous or liquid fuel per time unit than the combustion chamber in e.g. a reforming arrangement and assigned a gas turbine's exhaust gas inlet according to the invention. As known, heat may be recovered from the exhaust gases in the chimney 42.

The foregoing disclosure and description of the invention are illustrative and explanatory thereof, and various changes in the size, shape, and materials, as well as in the details of the illustrated system may be made without departing from the spirit of the invention. The invention is claimed using terminology that depends upon a historic presumptive presentation that recitation of a single element covers one or more, and recitation of two elements covers two or more, and the like.

What is claimed is:

1. A method for operating a process plant including a refining unit having at least one reformer, for a heat treatment of gas, and a power generator comprising:

generating power with a gas turbine;

supplying oxygen-containing exhaust gas from the gas turbine to a combustion chamber of the reformer through a channel, the channel consisting essentially of a conduit without a heater or a fan; and controlling operation of the gas turbine in order to supply exhaust gas to the reformer combustion chamber at an overpressure of approximately 0.5 bar and at a temperature of approximately 350 to 450 degrees C.

2. A method for operating a process plant including a refining unit having at least one reformer, for a heat treatment of gas, and a power generator comprising:

generating power with a gas turbine;

supplying exhaust gas from the gas turbine to a combustion chamber of the reformer to serve as combustion gas, the combustion gas consisting essentially of the turbine exhaust gas; and controlling operation of the gas turbine in order to cause the exhaust gas to advance from the gas turbine to the combustion chamber at an exhaust gas overpressure of approximately 0.5 bar and at an exhaust gas temperature of approximately 350 to 450 degrees C., which exhaust gas overpressure corresponds to the overpressure requirement of the combustion chamber.

3. The method of claims 1 or 2 that includes controlling the gas turbine to supply exhaust gas at an overpressure of approximately 0.5 to 0.7 bar.

4. The method of claims 1 or 2 wherein the generating power generates electric current.

5. The method of claims 1 or 2 wherein the controlling includes limiting power output from the gas turbine.

* * * * *

UNITED STATES PATENT AND TRADEMARK OFFICE
CERTIFICATE OF CORRECTION

PATENT NO. : 6,775,971 B1
DATED : August 17, 2004
INVENTOR(S) : Soland, Arne

Page 1 of 1

It is certified that error appears in the above-identified patent and that said Letters Patent is hereby corrected as shown below:

Title page,
Item [54], Title, "SUPPLING" should read -- SUPPLYING --.

Signed and Sealed this

Twenty-first Day of June, 2005

JON W. DUDAS
*Director of the United States Patent and Trademark Office*